Figure 4:
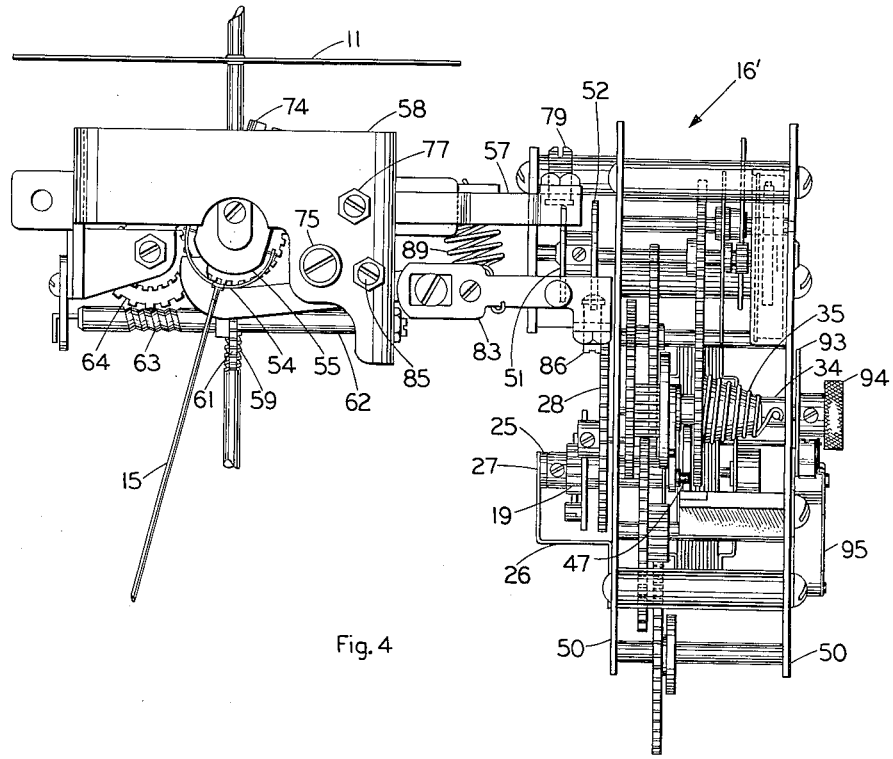

May 8, 1962  P. V. TERRY  3,034,056
SYNCHRONIZED RESETTING FOR A PLURALITY OF DEMAND METERS
Filed Aug. 15, 1956  3 Sheets-Sheet 1

Inventor:
Paul V. Terry
by Richard E. Hosley
His Attorney

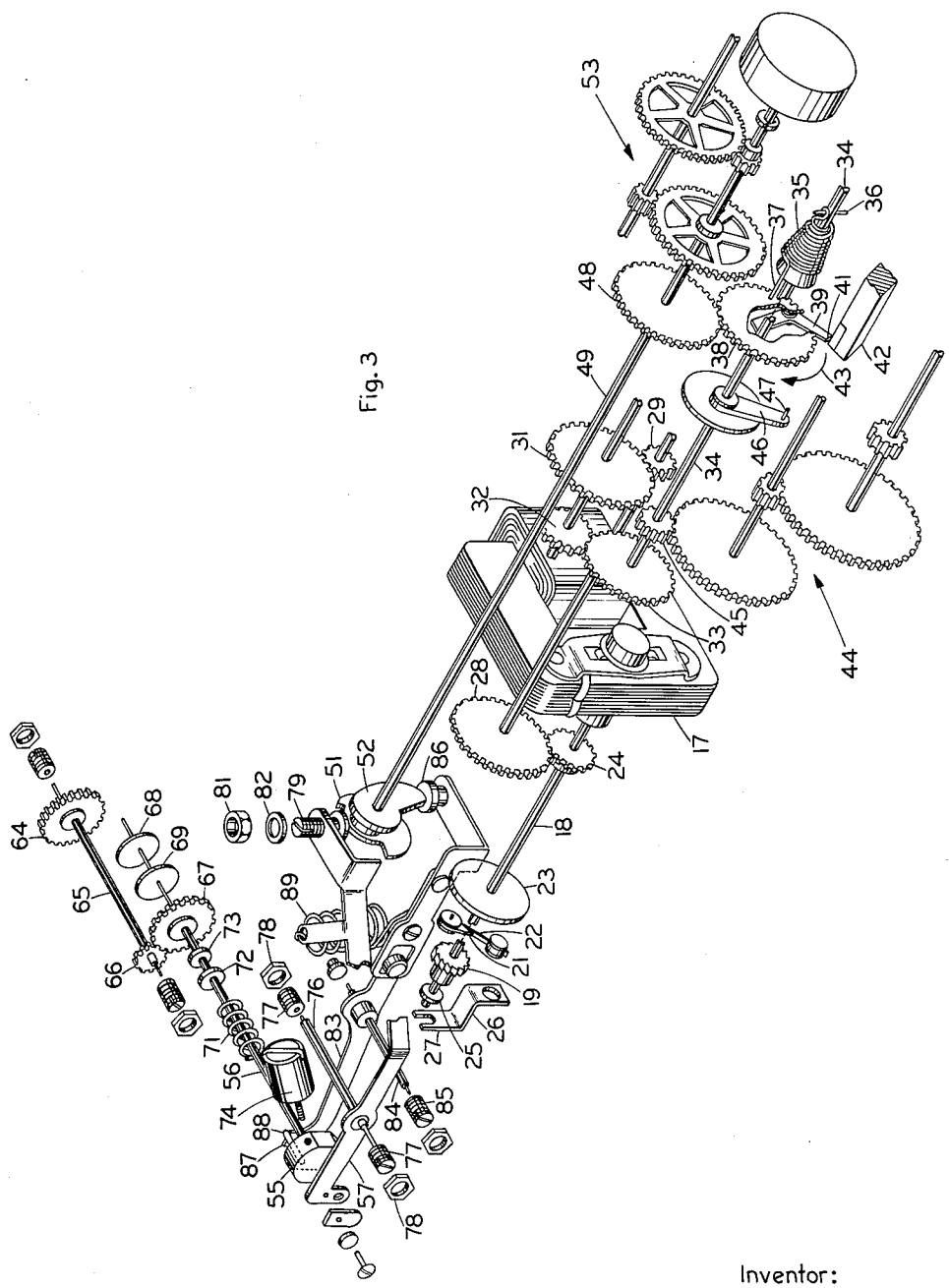

May 8, 1962 P. V. TERRY 3,034,056
SYNCHRONIZED RESETTING FOR A PLURALITY OF DEMAND METERS
Filed Aug. 15, 1956 3 Sheets-Sheet 3

Inventor:
Paul V. Terry
by Richard E. Hosley
His Attorney

United States Patent Office 3,034,056
Patented May 8, 1962

3,034,056
SYNCHRONIZED RESETTING FOR A PLURALITY
OF DEMAND METERS
Paul V. Terry, Eliot, Maine, assignor to General Electric
Company, a corporation of New York
Filed Aug. 15, 1956, Ser. No. 604,107
3 Claims. (Cl. 324—103)

This invention relates generally to improvements in watthour demand meters and more particularly to novel arrangements for a plurality of recording watthour demand meters which enables them to be reset in substantial synchronism.

In the art of demand metering, it is common to provide a plurality of recording watthour demand meters for a particular power generating and distributing system and heretofore each meter used in such a system was provided with a timing device which automatically reset its associated recording mechanism at the end of each successive demand interval.

If each demand meter in the system is set for the same demand interval, and each timing device is functioning perfectly, all of the demand meters in the system could be expected to reset in synchronism. However, practical considerations prevent such optimum performance for an indefinite period of time and it has been found that continued operation tends to produce resetting that is not in synchronism. Moreover, if it is desired to change the demand interval in the system, each demand meter must have its timing mechanism adjusted for the new conditions of operation.

Therefore, it is an object of this invention to provide improved reliable means for resetting a plurality of recording watthour demand meters in synchronism.

It is another object of the invention to provide improved reliable means for resetting a plurality of recording watthour demand meters in synchronism which also facilitates changing the demand interval for each of the demand meters.

Briefly, in one aspect thereof, the invention comprises the utilization of one of the demand meters to control the resetting action of all other demand meters associated with it in a particular system. The controlling or master demand meter may be of conventional design heretofore used in the art which has its resetting mechanism automatically actuated by a conventional timing motor at the end of each successive demand interval. All other demand meters have their timing motors removed and replaced by a high speed asynchronous induction motor, each of which is under the control of the master demand meter. Control means in the form of a normally open switch is associated with the master demand meter and is arranged so that the switch contacts close momentarily upon initiation of resetting in the master demand meter. The control switch is connected to each of the high speed motors and upon closure, all the motors are energized to initiate resetting action in their corresponding demand meters. Each high speed motor has a normally open holding switch connected thereto which closes upon actuation of the motor to continue energization thereof subsequent to opening of the control switch after its momentary closure. The holding switches let their associated high-speed motors run long enough to finish resetting, after which the holding switches automatically open to de-energize the motors until the next reset cycle occurs.

The arrangement is such that the resetting of the other demand meters occurs within a few seconds after reset of the master demand meter, thus resulting in synchronized resetting for all of the demand meters in the system.

Figures 1, 2:
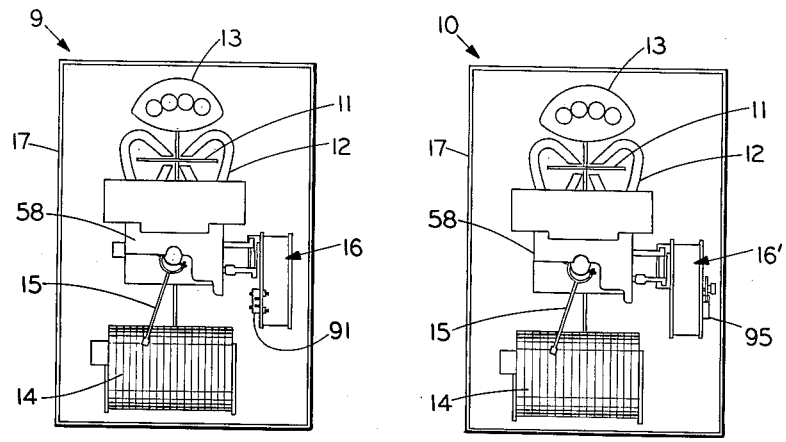
Figures 5, 6:
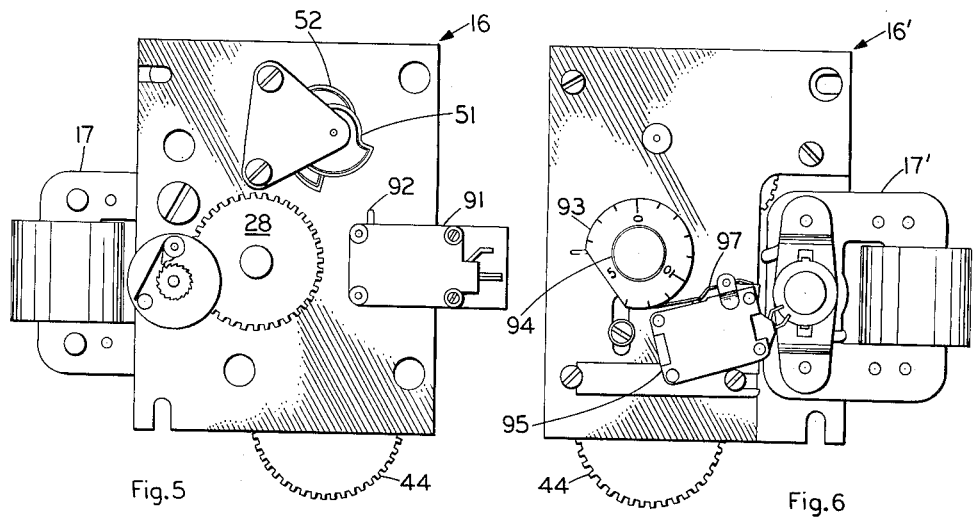
Figure 7:
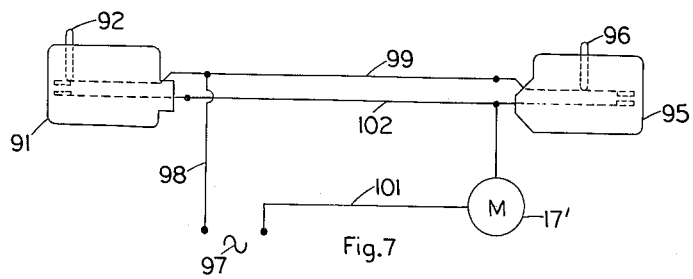
Figure 8:
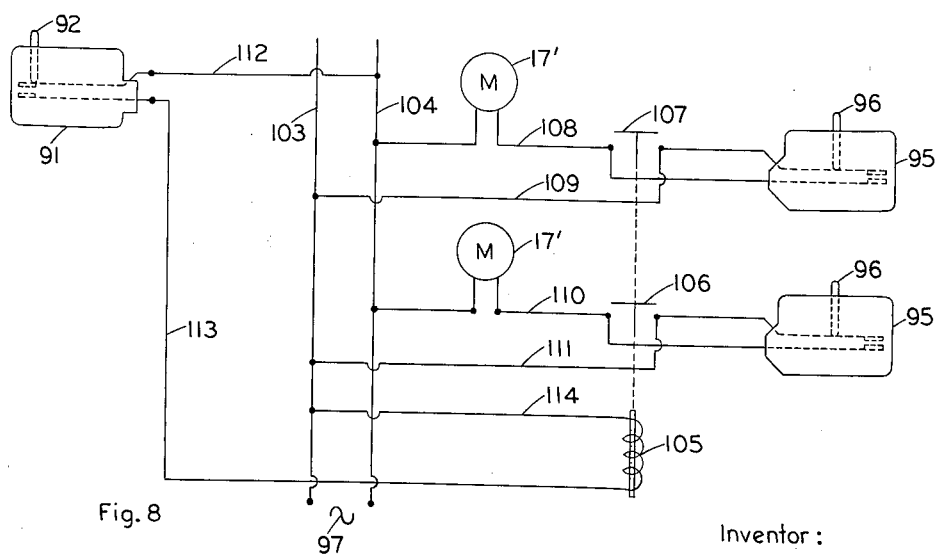

The objects of the invention, as well as the benefits and advantages attendant thereto, will be more fully understood upon reference to the following detailed description, particularly when taken in conjunction with the drawings annexed hereto, in which:

FIGURE 1 is a diagrammatic representation of a master recording watthour demand meter, and FIGURE 2 is a diagrammatic representation of a recording watthour demand meter similar to that shown in FIGURE 1 but modified to allow its resetting mechanism to be controlled in synchronism with the resetting mechanism of the master demand meter, and FIGURE 3 is an enlarged exploded view of the resetting mechanism embodied in the demand meters shown in FIGURES 1 and 2 wherein the motor shown could be either a timing motor for the device of FIGURE 1 or a high-speed motor for the device of FIGURE 2, and FIGURE 4 is an enlarged view in front elevation, of the mechanism shown in FIGURE 3 together with other portions of the demand meter shown in FIGURE 2, and representing with only slight modifications necessary, parts of the demand meter shown in FIGURE 1, and FIGURE 5 is an end view of a portion of the mechanism shown in FIGURE 4 modified to show the form of this part of the device when used as a part of the master unit of FIGURE 1, and FIGURE 6 is an end view of a portion of the mechanism as it appears in FIGURE 4, and FIGURE 7 is a schematic wiring diagram to show how two recording watthour demand meters can be arranged for synchronized resetting, and FIGURE 8 is a schematic wiring diagram to show how more than two recording watthour demand meters can be arranged for synchronized resetting.

Referring first to FIGURE 1, there is shown diagrammatically a conventional form of recording watthour demand meter 9 well known in the art as the Type DG recording watthour demand meter and manufactured for many years by applicant's assignee. Such demand meters are normally used for polyphase power networks, but in the interests of simplicity only one induction disc 11 has been shown, along with its associated braking magnets 12, in addition to the conventional dial register 13, strip chart 14, recording pen 15, resetting mechanism 16, all of which are suitably mounted within a housing 17.

In such a meter total power for successive predetermined intervals is measured and recorded, the intervals being known as demand intervals and the power measured within the interval being generally referred to as demand. The demand intervals may be of 15, 30 or 60 minute duration and the operation is such that each revolution of the disc 11, which represents a unit of kilowatt energy consumed, causes the pen 15 to be moved progressively to the right of the strip chart 14. The chart is continuously advancing so that the meter functions to present an unbroken trace of demand as it accumulates within the demand interval.

At the end of the demand interval, a timing arrangement causes the resetting mechanism 16 to move the pen back to zero demand, at the left of chart 14, so that the meter is ready to measure demand in the next succeeding demand interval.

The demand meter 10 shown in FIGURE 2 is in all respects identical to the demand meter shown in FIGURE 1, except for the resetting mechanism 16', and like numerals have been used in all cases where there is part identity. As a matter of fact, the resetting mechanisms 16 and 16' have many identical parts and like numerals will be used throughout the remainder of the specification whenever there is part identity in the two demand meters.

Looking now at FIGURE 3, there is shown an exploded view of the resetting mechanism used with but slight modification in each of the demand meters shown in FIGURES 1 and 2. In describing this mechanism, it will be assumed to be the mechanism 16 associated with demand meter 9 and the modifications necessary to convert it for use with demand meter 10 will be discussed at an appropriate point later on in the specification.

Thus, there is a timing motor 17, which may be the well known Telechron synchronous motor, having an output shaft 18 on which is mounted a drive unit comprising the ratchet gear 19, pivoted pawl 21, leaf spring 22, collar 23, and output driving pinion 24.

The ratchet gear 19 is securely fixed to shaft 18 and the pawl and leaf spring are mounted on collar 23 which may have the driving pinion 24 affixed thereto as an integral part. The collar and its associated driving pinion are free to rotate on shaft 18 and the leaf spring holds the pawl against the teeth of the ratchet gear, whereby rotation of the motor shaft in the proper direction causes rotation of the driving pinion. The combination of the ratchet gear, pawl and leaf spring operate as an overriding clutch to allow setting of the reset time, as desired.

Coupled to the pinion 24 is a gear train comprising the gears 28, 29, 31, 32, 33, suitably mounted for rotation, the last gear 33 being mounted on shaft 34 around which is disposed a conical coiled spring 35 having its end 36 anchored in shaft 34. The other end 37 of spring 35 is anchored in gear 38 which in turn is freely mounted on shaft 34. Pivotally mounted on gear 38 is a bellcrank 39 arranged such that its end 41 normally abuts against the stop 42 to prevent rotation of gear 38 in the direction of arrow 43.

With the above arrangement in mind, energization of timing motor 17 results in shaft 34 being rotated in the direction of arrow 43 and with the gear 38 locked against rotation in this direction by its bell-crank 39, it is evident that the spring 35 will be wound up to store energy therein. The parts are so arranged that the spring 35 will be fully wound up during the demand interval and the energy thus stored will then be used to reset the recorder pen 15.

While the spring 35 is being wound up, the timing motor 17 is also furnishing power for advancing the chart 14 at a uniform rate and for rerolling the used portion of the chart. A power take-off gear train 44 coupled to a pinion 45 mounted on shaft 34 is utilized for this purpose, the arrangements coupling this power take-off to the chart advancing and reroll mechanisms being conventional and well known in the art but omitted herein for the sake of brevity.

To release the energy stored in spring 35 a tripper in the form of a crank 46 is mounted on shaft 34 and rotates therewith. At the outer end of the crank 46 there is a tripping pin 47 which reaches a position underneath the bell crank 39 at the end of the demand interval and pushes the end 41 from the stop 42. Once the locking end of crank 39 is moved away from stop 42, the gear 38 is free to rotate and the spring 35 will thus unwind itself to release the energy stored therein and in doing so the gear 38 will be rapidly rotated to actuate the resetting mechanism.

Meshing with gear 38 is a gear 48 mounted on shaft 49 on one end of which are mounted a pair of spaced resetting cams 51 and 52 respectively and on the other end of which is mounted a governing mechanism 53 which regulates the release of energy from spring 35 in such a way that resetting is completed within one or two seconds following the end of the demand interval. Any suitable form of governing device could be used to perform this regulatory function and since such devices are conventional and are known in the art, further description thereof is unnecessary.

It is to be noted that resetting is accomplished when the gear 38 has completed one revolution, and when this occurs, the locking end 41 of bell-crank 39 abuts stop 42 to once again lock gear 38 against further rotation. The tripping pin 47 is now in front of bell-crank 39 and will rotate through one complete revolution in the next succeeding demand interval before it disengages crank 39 from stop 42 to permit resetting to occur again.

All of the parts so far described in FIGURE 3 are conveniently mounted on a pair of spaced support plates 50, which in turn are mounted conveniently within housing 17.

The cams 51, 52 complete one revolution during the resetting of the recording pen 15 and the manner in which these cams accomplish the resetting action will be best understood by first describing the driving mechanism for the recording pen and then describing the parts that cooperate with cams 51, 52 to accomplish resetting at the end of the demand interval.

Thus, referring to both FIGURES 3 and 4, it is seen that the pen 15 is supported at its upper extremity by means of a yoke 54 which is attached to the opposite sides of a flatted rotor 55 rigidly mounted on shaft 56. Shaft 56 is journalled for rotation at its outer extremity by a suitable bearing formed in the tip of a lever 57 and at its inner extremity by a suitable bearing (not shown) formed in the supporting bracket 58. Rotation of shaft 56 causes rotation of rotor 55 and since this rotor carries the pen arm, it is apparent that the pen will be moved across the chart to trace a record of demand.

Shaft 56 is rotated by means of the watthour meter forming a part of the demand meter and this occurs through the interaction of the worm 59 provided on the shaft of the induction disc 11, a worm wheel 61 carried by shaft 62 journalled for rotation in bracket 58, a worm portion 63 provided in shaft 62, a worm wheel 64 mounted on a shaft 65 also journalled for rotation in bracket 58, and a driving gear 66 fixed to shaft 65 which meshes with gear 67 mounted on shaft 56 and driving the shaft through a friction clutch arrangement.

With the above parts in mind, and assuming the gear 67 to be clutched to the shaft 56, it is apparent that rotation of the induction disc 11 will cause rotation of its associated shaft which in turn will rotate the shaft 62 through the cooperation of worm 59 and worm wheel 61. As shaft 62 rotates, its worm 63 will drive worm wheel 64 which in turn will cause shaft 65 to be rotated to thereby drive gear 66 which in turn drives gear 67 to rotate shaft 56.

As is best shown in FIGURE 3, the friction clutch for gear 67 comprises a clutch plate 68 secured to shaft 56 having arranged on one side thereof a friction washer 69. The gear 67 is adapted to rest against the friction washer 69, but since the gear is free to rotate relative to shaft 56, it must be firmly pressed against the washer to permit any power transmission between gear 66 and shaft 56. To hold the gear 67 against friction washer 69, there is provided a spring 71 surrounding shaft 56, one end of which abuts rotor 55 and the other end of which abuts the collar 72 which in turn abuts a hard rubber washer 73 to drive this washer against gear 67 to thereby couple it to the clutch mechanism.

The clutch arrangement described above is necessary to permit resetting of the recorder since during resetting the clutch readily slips while the pen is being returned to its zero position.

A counterweight 74 is attached to rotor 55 to bias the pen 15 in its zero position, there being a suitable stop pin projecting inwardly from the front plate of bracket 58 to act as a holding means for the counterweight. This stop pin may be formed on the end of a screw which projects through the front plate, the head of which is shown as part 75.

The lever 57 is pivotally mounted on bracket 58, extending through a suitable cutout in one of its sides and being mounted on a shaft 76 whose pin-like extremities cooperate with suitable bearings 77 carried by bracket 58 and affixed thereto by suitable nuts 78.

The outer end of lever 57 has affixed thereto a screw 79 whose head is in the form of a cam follower adapted for engagement with resetting cam 51. Screw 79 is suitably affixed to lever 57 by means of a cooperating nut 81 and lock washer 82.

As is well understood by those familiar with the type DG demand meter, the function of lever 57 is to put a small hook or quirk at the end of the record trace just prior to reset, and this occurs when the cam 51 is rotated upon initiation of the resetting cycle. The arrangement is such that the outer end of lever 57 is first raised a slight amount which has the effect of lowering the other end. Since the other end is the bearing for the shaft 56, it is apparent that this shaft will be lowered carrying with it pen 15 to move the pen downwardly relative to the chart 14 to thereby impart a quirk or hook to the record trace. Immediately following this, the pen is returned to zero.

To move the pen back to the zero position, the pen resetting lever 83 is pivotally arranged in the bracket 58, being mounted on shaft 84 which is similar to shaft 76 and also similarly journalled in the bracket by suitable bearings 85.

Lever 83 also extends through the cutout in one side of bracket 58 and has mounted on its outer end a screw 86 whose head cooperates with resetting cam 52, the screw being fastened to lever 83 in a manner similar to the fastening arrangement for screw 79. The inner extremity of lever 83 is in the form of a hook 87 which coacts with a pin 88 mounted on rotor 55 to accomplish the required resetting of pen 15.

Assuming that lever 57 has fulfilled its function by imparting a quirk or hook to the end of the record trace, the action of the resetting mechanism is such that the cam 52 will then depress the outer end of lever 83. This will cause the hook portion at the inner end of lever 83 to move upwardly to engage the pin 88 and move it in a direction for resetting. The configuration of cam 52 is such that it will cause the hook 87 to drive the pin 88 until counterweight 74 rests against its stop. While the pen is being moved back to the zero position, the clutch associated with gear 67 will slip and at the same time will act as a brake to permit the arm to travel smoothly back to its zero position.

A spring 89 is coupled between the outer ends of levers 57 and 83 to permit the two levers to return to their normal positions after resetting and position them properly against the resetting cams.

From the above, it is thus seen that the recording demand meter of FIGURE 1 can be reset automatically at the end of the demand interval through the interaction of the parts described above, the necessary power to accomplish resetting being furnished by the timing motor.

To utilize demand meter 9 as a master unit to control the resetting of other similar demand meters, it is necessary to add suitable control means which may take the form of the normally open switch 91 shown in FIGURE 5. This switch is mounted on the supporting structure of the resetting means and is arranged to have its actuating button 92 proximate to the outer end of lever 83. The switch is mounted so that its button is momentarily engaged during resetting to close its contacts and when this happens, the resetting motors for any associated demand meters are energized through a suitable circuit which may be the simple arrangement of FIGURE 7 when two demand meters are involved or the slightly more complex arrangement of FIGURE 8 when it is desired to reset in synchronism more than two demand meters.

In addition, it is not enough to just add a control switch to the master demand meter to effect synchronized resetting, for the resetting cycle of the resetting mechanism 16 actually consumes the entire demand interval (despite the fact that the pen arm is moved to its zero position in one or two seconds), in view of the fact that energy to move the pen arm is stored in the spring 35 by operation of timing motor 17 through the entire demand interval. In this type of device, the timing motor may operate at 1 r.p.m. and assuming that a similar motor were used in demand meters which are supposed to be reset in synchronism with the master demand meter 9, it is obvious that energization of the timing motor associated with the other demand meters would only start the reset cycle and without further change in the mechanism, actual resetting would not occur until another demand interval expires.

To eliminate this problem, the timing motor 17 used in resetting mechanism 16' has been replaced in any demand meters under the control of master demand meter 9 with a high speed asynchronous induction motor 17' operating at approximately 2400 r.p.m., and with such a high speed motor it has been found that the spring can be wound up and the crank released in less than one second, after which the spring will release its energy to complete the reset cycle. In replacing the timing motor 17 with the high speed motor 17', it is not necessary to modify the structure shown in FIGURE 3, except for the addition of a simple friction brake which functions to positively stop motor 17' at the end of the reset cycle. This brake comprises the friction washer 25 surrounding the outer extremity of shaft 18, together with the relatively stiff spring 26 having one of its ends in the form of yoke 27 arranged to bear against the washer. The washer in turn bears against portions of ratchet gear 19 to accomplish braking. It might be pointed out here that the overriding clutch shown in FIGURE 3 is not necessary with motor 17' and could be omitted, in which event the friction washer 25 would bear directly against the driving pinion 24 to accomplish the required braking.

FIGURE 4 shows the resetting mechanism 16' with the high speed motor 17' instead of the timing motor of demand meter 9 and FIGURE 6 shows an end view of the device shown in FIGURE 4. In both figures, it is seen that the shaft 34, on which is mounted the resetting spring, extends through a support plate and has affixed thereto a cam 93 and a manual setting knob 94. This cam cooperates with a holding device in the form of a normally open switch 95 connected to the high speed motor 17' and forming with the switch 91 the circuit shown in FIGURE 7.

Switch 95 has an actuating button 96 suitably arranged for cooperation with a pivotally mounted actuating arm 97, the outer tip of actuating arm 97 cooperating with cam 93 to perform switch actuation.

The position of the cam in FIGURE 6 shows the switch in its closed position, the normally open position being when the flat section of cam 93 is proximate to the outer end of actuating arm 97.

Referring now to FIGURE 7, it will be seen that motor 17' is connected to a source of electrical energy 97 through either of the switches 91, 95. Thus, line 98 of the source is connected to a common line 99 extending between corresponding contacts of the two switches, and line 101 from the source is connected through the motor 17' to another common line 102 extending between corresponding contacts of the two switches.

During the demand interval, both of these switches are open. When the master demand meter 9 begins resetting the switch 91 is momentarily closed. The circuit through motor 17' is energized through switch 91 and upon energization, it immediately drives cam 93 a sufficient amount to close switch 95 prior to the opening of switch 91. Switch 95 is thus a holding switch to continue energization of motor 17' until resetting action is completed. Shortly after switch 95 is closed, control switch 91 opens, leaving the motor entirely under the control of the holding switch. The motor will run at high speed to wind up the resetting spring and then release it, all in the space of less than a second, after which resetting of the pen arm will occur through the normal action of the resetting cams 51, 52 and associated levers and links.

By the time the spring has been wound up and released, cam 93 has turned through nearly a complete revolution such that the flat portion of its surface is again proximate to the outer end of actuating arm 97 in which position of the parts the switch 95 opens. Motor 17' is then de-energized and will remain so until the end of the next demand interval. The friction brake described above prevents overshooting of the motor 17' when it is de-energized.

If it is desired to have more than two demand meters reset in synchronism, additional switches may be connected in parallel with switch 91 in a manner similar to the arrangement shown in FIGURE 7, but it may be desirable to use a slightly more complex arrangement than that of FIGURE 7, wherein initial energization of the high speed motor 17' is through an isolating relay.

Referring now to FIGURE 8, it is seen that switch 91 is connected by leads 112, 113 and 114 across a pair of energy supply lines 103, 104, through an isolating relay coil 105 which has associated with it contacts 106 and 107.

The contacts 106 and 107 operate as jumpers, by-passing switches 95, to connect motors 17' across the lines 103, 104 via the leads 108, 109, 110, 111. In parallel with the contacts 106, 107 and connected to the leads 108, 109, 110, 111, are the normally open switches 95 which close upon energization of their associated high speed motors 17'.

Thus, when switch 91 is actuated, the motors 17' are energized and their energization is continued through the holding switches upon de-energization of coil 105 which permits the jumping contacts 106, 107 to open.

In both of the aforesaid arrangements, the switch 91 is not closed until about one-half second after initiation of reset, and since the motors 17' take less than a second to wind up their associated springs, it is apparent that almost one and one-half seconds elapse before resetting begins in the follower demand meters. Since the master demand meter completes resetting in one to two seconds, it is apparent that the follower demand meters do not begin to reset until resetting of the master demand meter is nearly completed and therefore do not complete their resetting until about one and one-half seconds after resetting is finished in the master demand meter in view of the fact that the time is the same in both master and follower demand meters for return of the pen to its zero position. The delay of a few seconds is of no practical significance and the system may be considered as resetting substantially in synchronism.

From the above, it is seen that the master demand meter 9 of FIGURE 1 can be modified by the replacement of its control switch 91 with a holding switch 95 and associated cam, along with replacement of timing motor 17 with the high speed motor 17' to form the demand meter 10 which can be reset in synchronism with the master unit. All other parts of the resetting mechanism may remain unchanged, except for the friction brake added to control motor 17' and the arrangement is such that conversion of conventional recording watthour demand meters is accomplished at minimum cost and with utmost ease. Any number of demand meters can be reset in synchronism by merely adding similar control circuits to the arrangement of FIGURE 8 for each additional demand meter to be included in the synchronized system.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. A synchronized watthour demand measuring system, comprising, in combination: a plurality of recording watthour demand meters each of which includes means for recording watthour demand in each interval of a succession of demand intervals along with electric motor driven means for resetting the recording means at the end of each demand interval; said electric motor forming a part of one of said demand meters comprising a continuously operating rotary timing motor which automatically operates to initiate actuation of its associated resetting means at the end of each demand interval; each of said electric motors forming a part of each of the remainder of said demand meters comprising an intermittently operating rotary high speed motor; a normally open control switch associated with said one demand meter momentarily closing in response to actuation of its corresponding resetting means; energizing circuit means for each of said high speed motors including said control switch, each of said high speed motors being energized upon closure of said control switch; and a normally open holding switch associated with each of said high speed motors, each of said holding switches being connected in the energizing circuit of its corresponding high speed motor and automatically closing in response to actuation of its high speed motor to continue energization thereof for a predetermined period of operation, said control switch automatically opening after said holding switches are closed, each of said holding switches automatically opening after said predetermined period of operation to de-energize its corresponding high speed motor; the actuation of each resetting means associated with a high speed motor being initiated just prior to opening of its corresponding holding switch.

2. The combination defined by claim 1 wherein said resetting means associated with said one demand meter completes its actuation in a first predetermined period of time and said resetting means associated with each of the remainder of said demand meters completes its actuation in a second predetermined period of time, said second predetermined period being no greater than said first predetermined period.

3. The combination defined by claim 2 wherein said resetting means associated with said one demand meter completes its actuation in no more than two seconds, said control switch closes about one-half second following initiation of actuation of its corresponding resetting means, each of said high speed motors is energized for almost one second prior to initiation of actuation of its corresponding resetting means, and each of said latter resetting means completes its actuation in no more than two seconds.

References Cited in the file of this patent

UNITED STATES PATENTS

| 1,814,278 | Beard | July 14, 1931 |
|---|---|---|
| 1,926,851 | Hamill | Sept. 12, 1933 |
| 2,048,477 | Witherow | July 21, 1936 |
| 2,290,626 | Bosomworth | July 21, 1942 |
| 2,363,958 | Goodman | Nov. 28, 1944 |